US006617072B2

United States Patent
Venkatesan et al.

(10) Patent No.: US 6,617,072 B2
(45) Date of Patent: Sep. 9, 2003

(54) POSITIVE ACTIVE ELECTRODE COMPOSITION WITH GRAPHITE ADDITIVE

(75) Inventors: Srinivasan Venkatesan, Southfield, MI (US); Binay Prasad, Shelby Township, MI (US); Kenneth Laming, Columbus, MI (US); Boyko Aladjov, Rochester Hills, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/994,278

(22) Filed: Nov. 27, 2001

(65) Prior Publication Data

US 2003/0104280 A1 Jun. 5, 2003

(51) Int. Cl.$^7$ ................................................ H01M 4/52
(52) U.S. Cl. .................... 429/223; 429/218.2; 429/232; 429/217; 429/206
(58) Field of Search ................................ 429/232, 217, 429/218.1, 206, 218.2, 223, 233, 241, 242, 27, 29

(56) References Cited

U.S. PATENT DOCUMENTS 5,500,309 A * 3/1996 Lichtenberg et al. ........ 429/223
5,543,250 A * 8/1996 Yanagihara et al. ........ 429/241

OTHER PUBLICATIONS

Wypych, George. "Handbook of Fillers, 2$^{nd}$ Edition", ChemTee Publishing, Toronto, Ontario, Chapter 2.1.33, 1999 and 2000.*
Pierson, Hugh. "Handbook of Carbon, Graphite, Diamond and Fullerenes", Noyes Publication, p. 82, 1993.*

* cited by examiner

Primary Examiner—Laura Weiner
(74) Attorney, Agent, or Firm—Philip H. Schlazer; Marvin S. Siskind

(57) ABSTRACT

An active composition for an electrode of an electrochemical device. The active composition comprises an active electrode material, a carbon material, and a binder where the binder comprises an elastomeric polymer. Preferably, the active electrode material is nickel hydroxide, the carbon material is graphite and the elastomeric polymer is styrene-butadiene.

9 Claims, No Drawings

POSITIVE ACTIVE ELECTRODE COMPOSITION WITH GRAPHITE ADDITIVE

FIELD OF THE INVENTION

The present invention relates to electrodes for electrochemical devices such as batteries and fuel cells. In particular, the present invention relates to an active composition for use in electrodes of electrochemical devices.

BACKGROUND OF THE INVENTION

Electrochemical devices include both batteries and fuel cells. Rechargeable batteries may be classified as "nonaqueous" batteries or "aqueous" batteries. An example of a nonaqueous battery is a lithium-ion battery which uses intercalation compounds for both anode and cathode, and a liquid organic based or polymer electrolyte. Aqueous batteries may be classified as either "acidic" or "alkaline". An example of an acidic battery is a lead-acid battery which uses sulfuric acid as the electrolyte, lead dioxide as the active material of the positive electrode, and metallic lead, in a high-surface area porous structure, as the negative active material.

Examples of alkaline batteries are "nickel-based" alkaline batteries. These batteries use an alkaline electrolyte (such a potassium hydroxide) and nickel hydroxide as the active material for the positive electrode. Nickel hydroxide has been used for years as an active material for the positive electrode of alkaline batteries. The reactions that take place at the positive electrode of a nickel-based rechargeable battery are reversible and include the following chemical reaction:

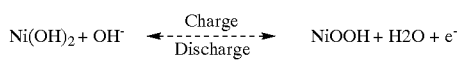
(1)

At the positive electrode, $Ni(OH)_2$ is oxidized to NiOOH during the charge operation. During discharge, the NiOOH is reduced to $Ni(OH)_2$. Examples of such nickel-based alkaline batteries include nickel-metal hydride batteries (Ni—MH), nickel cadmium batteries (Ni—Cd), and nickel-zinc batteries (Ni—Zn). Ni—MH batteries comprise negative electrodes having a hydrogen storage alloy as the active material. The hydrogen storage alloy is capable of reversible electrochemical storage of hydrogen. In general, Ni—MH batteries utilize a negative electrode that is capable of reversible electrochemical storage of hydrogen, and a positive electrode of nickel hydroxide material. The negative and positive electrodes are spaced apart in the alkaline electrolyte.

Upon application of an electrical potential across a Ni—MH battery, the hydrogen storage alloy of the negative electrode is charged by the electrochemical discharge of hydrogen and the electrochemical generation of hydroxyl ions:

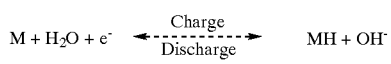
(2)

The negative electrode reactions are reversible. Upon discharge, the stored hydrogen is released to form a water molecule and release an electron. (In a Ni—Cd cell, cadmium metal is the active material in the negative electrode).

The active electrode material for both the positive and negative electrodes is usually affixed to a conductive substrate to form the positive and negative battery electrodes. One way to affix the active material to the conductive substrates is to first make the active materials into a paste by adding a small amount of binder, and then applying this paste to the substrate. The present invention is directed to a new active electrode composition having improved electrochemical and mechanical properties.

SUMMARY OF THE INVENTION

Disclosed herein is an electrode for an electrochemical device, comprising: an active electrode material; a carbon material; and a elastomeric polymer.

Also disclosed herein is an electrode for an electrochemical device, comprising: an active electrode material; a carbon material; and a elastomeric polymer.

Also disclosed herein is an electrochemical device, comprising: an active electrode composition, comprising: active electrode material; a carbon material; and a elastomeric polymer.

DETAILED DESCRIPTION OF THE INVENTION

Disclosed herein is an active composition for an electrode of an electrochemical device. Preferably, the electrochemical device is a battery having one or more positive electrodes, one or more negative electrodes and an electrolyte. Generally, the active electrode composition comprises an active electrode material, a carbon material, and an elastomeric polymer. The elastomeric polymer is used as a binder for the active composition. Preferably, the active electrode composition is in the form of a physical mixture of the active electrode material, the carbon material and the elastomeric polymer. The mixture may be a dry mixture or a paste (a wet mixture). Preferably, the mixture is in the form of a paste.

Generally, the active electrode materials may be either a positive electrode material or a negative electrode material. Examples of positive electrode materials are powders of lead oxide, lithium cobalt dioxide, lithium nickel dioxide, lithium manganese oxide compounds and transition metal oxides, manganese dioxide, zinc oxide, nickel oxide, nickel hydroxide, manganese hydroxide, copper oxide, molybdenum oxide, carbon fluoride, etc.

Examples of negative electrode materials include metallic lithium and like alkali metals and alloys thereof, alkali metal absorbing carbon materials, zinc, cadmium hydroxide, hydrogen absorbing alloys, etc.

Preferably, the active electrode material is a positive electrode material. More preferably, the active electrode material is a nickel hydroxide material. It is within the spirit and scope of this invention that any nickel hydroxide material be used as the active material. Examples of nickel hydroxide materials are provided in U.S. Pat. Nos. 5,348,822, 5,637,423 and 6,177,213, the contents of which are incorporated by reference herein.

As described, the active composition comprises an active electrode material, a carbon material and an elastomeric polymer. Examples of possible carbon materials that may be used in the active composition include graphites. Other examples include carbon materials that contain graphitic carbons, such as graphitized cokes. Still other examples of possible carbon materials include non-graphitic carbons which are considered amorphous, non-crystalline, and disordered, such as petroleum cokes and carbon black. Preferably, the carbon material is a graphite.

The graphite (or other forms of the carbon material) is preferably in the form of a particulate (i.e., particles). The particles may have a variety of shapes. For example, they may be substantially spherical. Alternately, the particles may be elongated where one dimension is longer than another dimension. The particles may be in the form of threadlike fibers. In addition, the particles may be in the form of flakes.

The graphite used should be electrically conductive and is preferably present in sufficient amount to form an electrically conductive network of graphite particles within the active composition. In one embodiment of the invention the active composition preferably comprises at least 10 wt percent of the graphite, more preferably at least 13 wt percent of the graphite, and most preferably at least 15 wt percent of the graphite. In another embodiment of the invention, the active composition preferably comprises between about 10 wt percent to about 25 wt percent of the graphite, more preferably between about 13 wt percent to 20 wt percent of the graphite, and most preferably between about 13 wt percent to about 17 wt percent of the graphite.

It is noted that during the charging process of certain rechargeable batteries, such as a sealed nickel-metal hydride battery, the positive electrode reaches full charge before the negative and begins to evolve oxygen, $$2OH^- \rightarrow H_2O + 1/2 O_2 + 2e^- \quad (3)$$

The evolved oxygen can oxidize the positive electrode and cause its mechanical disintegration, thereby reducing the electrode's cycle life. In particular, the oxidation can reduce the adhesion and electrical conductivity between the active nickel hydroxide particles and the substrate, thereby increasing the electrode's resistance and reducing the amount of power available for output.

Furthermore, it is also believed that the evolved oxygen promotes the oxidation of the graphite by the reaction $$C + O_2 \rightarrow CO_2 \quad (4)$$

Oxidation of the graphite reduces the conductivity of the graphite and may also reduce the ion conducting properties of the battery electrolyte. (For example, in the case of a potassium hydroxide electrolyte, the carbon dioxide formed as a result of graphite oxidation "poisons" the electrolyte by reacting with the potassium hydroxide to form potassium carbonate).

Hence, it is preferable that the graphite used in the active composition be resistant to oxidation. Oxidation resistance of the graphite depends on many different factors. For example, it is believed that the rate of oxidation of the graphite is at least partially related to the surface area of the graphite. More specifically, it is believed that the larger the surface area, the easier it is for the graphite to be oxidized.

Hence, it is preferable that the surface area of the graphite, as determined by the Brunauer-Emmett-Teller, or "BET" method, is less than or equal to about 15.0 square meters per gram, and more preferably less than or equal to about 10.0 square meters per gram, and most preferably less than or equal to about 7.5 square meters per gram. In certain embodiments of the invention, the BET surface area may be less that or equal to 6.0 square meters per gram.

Also, while not wishing to be bound by theory, it is further believed that the oxidation resistance of the graphite is also at least partially related to the crystallite height of the graphite where the crystallite height is the size of the graphite in the direction of the c-axis (Lc). More specifically, it is believed that a larger crystallite height increases the oxidation resistance of the graphite. It is preferable to use a graphite with a crystallite height Lc which is greater than 95 nm. It is believed that that a crystallite height Lc which is greater than 95 nm reduces the surface area of the grain boundaries between the crystallites sufficiently to prevent unacceptable levels of oxidation. Preferably, the crystallite height Lc is measured using the Warren-Scherrer method.

In one embodiment of the invention, the crystillinity of the graphite is such that the crystallite height Lc is preferably greater than 95 nm, more preferably greater than or equal to about 125 nm, and most preferably greater than or equal to about 175 nm. Certain embodiments of the present invention may use a graphite having a crystallite height Lc which is greater than 200 nm.

It is also believed that the oxidation resistance of the graphite may depend, at least in part, on the particle size distribution of the graphite. The graphite may be chosen that has a particle size distribution wherein preferably at least 90% wt of the particles are greater than 15 microns, more preferably at least 90% wt of the particles are greater than 20 microns, and most preferably at least 90% of the particles are greater than 40 microns. Again, while not wishing to be bound by theory, it is believed that particles with a larger particle size distribution have a smaller surface area and, hence, may have a higher resistance to oxidation.

It is further believed that the oxidation resistance of the graphite also depends, at least in part, on the amount of the surface defects on the graphite particles. It is believed that a smaller number of surface defects increases the oxidation resistance of the graphite.

In addition, it is preferable that the graphite used be anisotropic. That is, is it preferable that its fundamental physical properties (e.g., electronic resistivity) vary with direction.

As described, the active composition comprises an active electrode material, a carbon material (preferably a graphite) and an elastomeric polymer. Examples of elastomeric polymers include styrene-butadiene (SB), styrene-butadiene-styrene block copolymer (SBS), styrene-isoprene-styrene block copolymer (SIS) and styrene-ethylene-butadiene-styrene block copolymer (SEBS). Preferably, the elastomeric polymer is a styrene-butadiene.

In one embodiment of the invention, the molecular weight of the elastomeric polymeric used is preferably in the range of 25,000 to 500,000 and, more preferably, in the range of 30,000 to 300,000. Blends or mixtures of two or more elastomeric polymers may be used.

The elastomeric polymer may be in the form of a dry powder or in the form of a liquid suspension. Elastomeric polymers that are in the form of dry powders are preferably mixed with a non-aqueous solvent or an aqueous solvent to form a liquid suspension. For example, the styrene-butadiene may be mixed with a non-aqueous solvent such as toluene to form a liquid suspension of the styrene-butadiene.

Preferably, the active composition comprises at least about 0.1 weight percent of the elastomeric polymer. More preferably, the active composition comprises between about 0.1 weight percent and about 4 weight percent of the elastomeric polymer. Most preferably, the active composition comprises between about 0.2 weight percent and about 0.8 weight percent of the elastomeric polymer. In certain embodiments of the invention, the active composition preferably comprises between about 0.3 weight percent and about 0.5 weight percent of the elastomeric polymer.

The styrene-butadiene binder may also be resistant to oxidation. Hence, it is also believed that the styrene-butadiene binder may also protect the electrode from oxidation and deterioration, thereby increasing the integrity and cycle life of the electrode.

As discussed above, the elastomeric polymer serves as a binder for the active composition and is preferably intermixed with the active electrode material and the carbon. Preferably, the elastomeric polymer is intermixed with the active electrode material and carbon material so as to form a paste. Hence, if the elastomeric polymer is in solid form, it is preferably dissolved in an appropriate solvent before being mixed with the active electrode and carbon materials. After, the elastomeric polymer is dissolved, the active electrode material and the carbon material is added in order to form the active paste composition. In a preferred embodiment of the present invention, the active electrode composition comprises between about 60 to 80 wt % nickel hydroxide, between about 1 to 10 wt % cobalt metal, between about 1 to 10 wt % cobalt oxide, between about 10 to 25 wt % graphite, and between about 0.1 to 4 wt % of styrene butadiene.

Also disclosed herein is an electrode for an electrochemical device. The electrode comprises the active composition described above. The electrode preferably also includes a conductive substrate which serves as a mechanical support for the active composition. The substrate also serves as a current collector. The active composition is affixed to the conductive substrate.

The conductive substrate may be any electrically conductive support known in the art capable of holding the active material composition. It is within the spirit and intent of this invention that any and all kinds of electrically conductive substrates may be used. Examples of substrate include expanded metal, perforated metal, expanded metal, screen, mesh, matte, metal foil, and foam. Generally, any metal may be used for the substrate as long as it is immune from corrosion at the pH and potential of the electrode. Examples of metals include nickel, nickel alloy, nickel plated steel, and nickel plated copper. Substrate for the negative electrode may further include copper or copper alloy.

Preferably, the substrate used is an expanded metal, perforated metal, screen, mesh, or foil. That is, it is preferable that a thinner and less expensive substrate material be used instead of the thicker and more expensive foam material.

The addition of an elastomeric polymer binder (such as styrene-butadiene) to an active electrode material (such as a nickel hydroxide material) improves the adhesiveness, strength, durability, and elasticity of the overall active composition. The elastomeric polymer increases the particle-to-particle bonding of the active material as well as the bonding between the active material and the substrate. The increased particle-to-particle and particle-to-substrate bonding keeps the active electrode composition intact thereby reducing the possibility that the active composition becomes loose and penetrates one of the separators to cause an electrical short. The improved adhesiveness also increases the flexibility of the electrode. Hence, the electrodes may be twisted, bent and wound more easily. The electrodes are thus more durable and have increased cycle life.

The improved adhesiveness of the active composition provided by the elastomeric polymer thereby permits the use of thinner (and possibly less expensive) substrate materials, such as expanded metal, screen, mesh or foil, for supporting the active material in place of thicker (and possibly more expensive) foam. Because of the improved adhesiveness and flexibility of the active composition, the composition remains attached to the thinner substrate materials. (That is, by using the elastomeric polymer binder, the three-dimensional support structure of the foam is not needed to make a durable, long-lasting electrode).

In addition, the adhesiveness provided by the elastomeric polymer binder provides for improved electrical contact (i.e., improved electrical conductivity) between the active particles and the substrate. This reduces the internal resistance of the electrode so that less power is wasted from internal dissipation and more power is available to apply to an external load.

Furthermore, the added carbon material, such as the graphite particles, serves as a conductive network within the active composition allowing electrical current to flow from the active electrode material to the thinner substrate. Hence, the conductive network provided by the graphite particles is an effective substitute for the three-dimensional conductive network of the foam material.

It is particularly noted that foam materials (such as nickel foam) have been widely used as the substrate material for many different types of positive electrodes (especially nickel hydroxide positive electrodes). The active electrode composition of the present invention thus allows for the replacement of the foam substrate in the positive electrode with a thinner and less expensive substrate material.

The electrode of the present invention is preferably a paste-type electrode. The active composition is formed by mixing the active electrode material, the carbon material and the elastomeric polymer (dissolved in a solvent) to form a paste which is affixed to the substrate. After the paste is applied to the substrate, the resulting electrode may then be allowed to dry. After the electrode is dried, it may then be compacted to reduce the thickness of the electrode even further. Compaction may be accomplished through the use of one or more rolling mills. A preferred embodiment of the present invention is a "nickel electrode" using an active composition comprising a nickel hydroxide material. Preferably, the nickel-electrode is a paste-type nickel electrode. Preferably, the active composition is pasted onto an expanded metal substrate.

Also disclosed herein is an electrochemical device incorporating the active electrode composition described above. Electrochemical devices include batteries as well as fuel cells. Preferably, the electrochemical device is a battery comprising at least one positive electrode, at least one negative electrode, and an electrolyte. The positive electrodes and/or the negative electrodes may be formed using the active electrode composition of the present invention. That is, the positive electrodes may be formed using an active positive electrode material, a carbon material, and a binder comprising an elastomeric polymer. Preferably, the active positive electrode material is a nickel hydroxide material. Also, the negative electrode may be formed using an active negative electrode material, a carbon material, and an elastomeric polymer. Preferably, the negative electrode material is a nickel hydroxide material.

Preferably, the battery is an aqueous battery using an aqueous electrolyte. More preferably, the battery is an alkaline battery using an alkaline electrolyte. Typically, the alkaline electrolyte is an aqueous solution of an alkali metal hydroxide such a potassium hydroxide, lithium hydroxide, sodium hydroxide or mixtures thereof.

An example of an alkaline battery of the present invention is an alkaline nickel-metal hydride (Ni—MH) battery. The Ni—MH battery may be formed by using positive electrodes having an active composition comprising a nickel hydroxide material, a carbon material (such as graphite) and an elastomeric polymer (such as styrene-butadiene). The negative electrodes are metal-hydride electrodes comprising a hydrogen storage alloy as the active negative electrode material.

As noted above, the use of the elastomeric polymeric binder permits the use of a thinner substrate and the production of a thinner, cheaper and more durable electrode. The new electrode decreases the cost of the battery and also increases the capacity of the battery by permitting a greater number of electrodes to be placed within the battery case.

EXAMPLE

A first active positive electrode paste (the "control" material) was prepared using 88.6 wt % $Ni(OH)_2$, 5.0 wt % Co, 6 wt % CoO and 0.4 wt % PVA binder (polyvinyl alcohol) binder. The paste was affixed to a nickel foam substrate to form "control" positive electrodes.

A second active positive electrode paste (the "modified" material) was prepared using 74 wt % $Ni(OH)_2$, 5.0 wt % Co, 6 wt % CoO, 15 wt % graphite and 0.4 wt % styrene-butadiene. The graphite used is the SFG-44™ from TIMCAL Ltd. having a crystallite height Lc greater than 200 nm, an interlayer distance between 0.3354 nm and 0.3358 nm, and a BET surface area of about 5 square meters per gram. At least 90% (wt) of the graphite particles are between about 44 and 53 microns in size. The paste was affixed to nickel expanded metal substrates to form "modified" positive electrodes. The theoretical capacity of the modified electrodes was about 300 milliamp-hours and the capacity obtained was about 225 milliamp-hours. Thus the efficiency of the electrodes was 75%.

Using the above identified "control" and "modified" positive electrodes, "control" and "modified" nickel metal hydride batteries were made using negative electrode comprising the same hydrogen storage alloy. All of the batteries were cycled (charged/discharged) using the same procedure (charged at 20 milliamps and discharged at 30 milliamps). The specific power was measured at 50% DOD ("Depth of Discharge") and at 80% DOD. The results are presented in Table 1. The specific power is provided in Watts per kilogram (W/kg). The cycle life of the control batteries and the modified batteries is shown in Table 2.

TABLE 1

| Specific Power (W/kg) | 50% DOD | 80% DOD |
|---|---|---|
| Control | 250–300 | 225–250 |
| Modified | 350–400 | 275–325 |

TABLE 2

| | Cycle Life at 80% DOD |
|---|---|
| Control | 500–700 |
| Modified | 1000+ |

As noted from Table 1 and Table 2, the specific power of the modified batteries was higher than that of the control batteries at both 50% and 80% DOD. Also, the cycle life of the modified batteries was greater than the cycle life of the control batteries.

As noted above, electrochemical devices, include fuel cells as well as batteries. It is possible that the active compositions of the present invention may also be used as the active composition for the hydrogen electrode (commonly referred to as the "anode") and/or the oxygen electrode (commonly referred to as the "cathode") of a fuel cell. In particular, the active electrode compositions of the present invention may be used as the active composition for the electrodes of an alkaline fuel cell. The fuel cell preferably uses a metal hydride electrode as the anode. As example of an alkaline fuel cell is presented in U.S. patent application Ser. No. 09/524,116, the disclosure of which is incorporated by reference herein.

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. A battery cell, comprising:

at least one negative electrode comprising a hydrogen storage alloy active material;

at least one positive electrode comprising an active composition comprising a nickel hydroxide material, a carbon material and an elastomeric polymer; and an electrolyte, wherein said battery cell has a cycle life of at least 1000 cycles at 80 percent depth of discharge.

2. The battery cell of claim 1, wherein said active composition is a paste.

3. The battery cell of claim 1, wherein said elastomeric polymer comprises a material selected from the group consisting of styrene-butadiene, styrene-butadiene block copolymer, styrene-isoprene-styrene block copolymer and styrene-ethylene-butadiene-styrene block copolymer.

4. The battery cell of claim 1, wherein said carbon material comprises graphite.

5. The battery cell of claim 4, wherein said graphite has a crystallite height greater than or equal to 95 nm.

6. The battery cell of claim 4, wherein said graphite has an interlayer distance c/2 between 0.335 nm and 0.345 nm.

7. The battery cell of claim 1, wherein said electrolyte is an alkaline electrolyte.

8. The battery cell of claim 1, wherein said carbon material has a BET surface area less than 15 square meters per gram.

9. The battery cell of claim 1, wherein active composition comprises at least 10 weight percent of said carbon material.

* * * * *